United States Patent [19]

Fujita

[11] 3,757,260

[45] Sept. 4, 1973

[54] STATION SELECTOR

[75] Inventor: Osamu Fujita, Fujisawa, Japan

[73] Assignee: Matsushita Electric Industrial Co., Ltd., Osaka, Japan

[22] Filed: Feb. 8, 1972

[21] Appl. No.: 224,433

[30] Foreign Application Priority Data

Feb. 9, 1971 Japan ................................ 46/5758

[52] U.S. Cl. .................... 334/15, 307/264, 325/465, 334/7

[51] Int. Cl. .............................................. H03j 5/08

[58] Field of Search ............................ 334/1, 7, 15; 325/464, 465, 468

[56] References Cited

UNITED STATES PATENTS

| | | | |
|---|---|---|---|
| 3,528,044 | 9/1970 | Manicki | 334/15 |
| 3,654,557 | 4/1972 | Sakamoto et al. | 334/15 X |
| 3,503,018 | 3/1970 | Cavanagh | 334/15 |
| 3,518,586 | 6/1970 | Nilssen et al. | 334/15 X |

*Primary Examiner*—Paul L. Gensler
*Attorney*—Richard K. Stevens, J. H. Fielding Jukes, F. Richard Malzone, Davidson C. Miller, Richard C. Harris, Angelo J. Mele, Ellsworth H. Mosher, Farrell R. Werbow, Robert J. Frank, Roger L. Hansel and William A. Knoeller

[57] ABSTRACT

A simply operable station selector for television receivers and other communication units. It has a plurality of touch pieces corresponding to respective channels, and a desired channel may be tuned in by merely touching the corresponding touch piece with a finger.

6 Claims, 7 Drawing Figures

STATION SELECTOR

The invention relates to station selectors for television receivers and other communication units, and it has an object of providing an excellent one-touch station selector with which it is possible to switch over to a desired channel by merely touching a corresponding touch piece.

The invention will now be described in conjunction with some embodiments thereof with reference to the accompanying drawings, in which.

Figure 1:
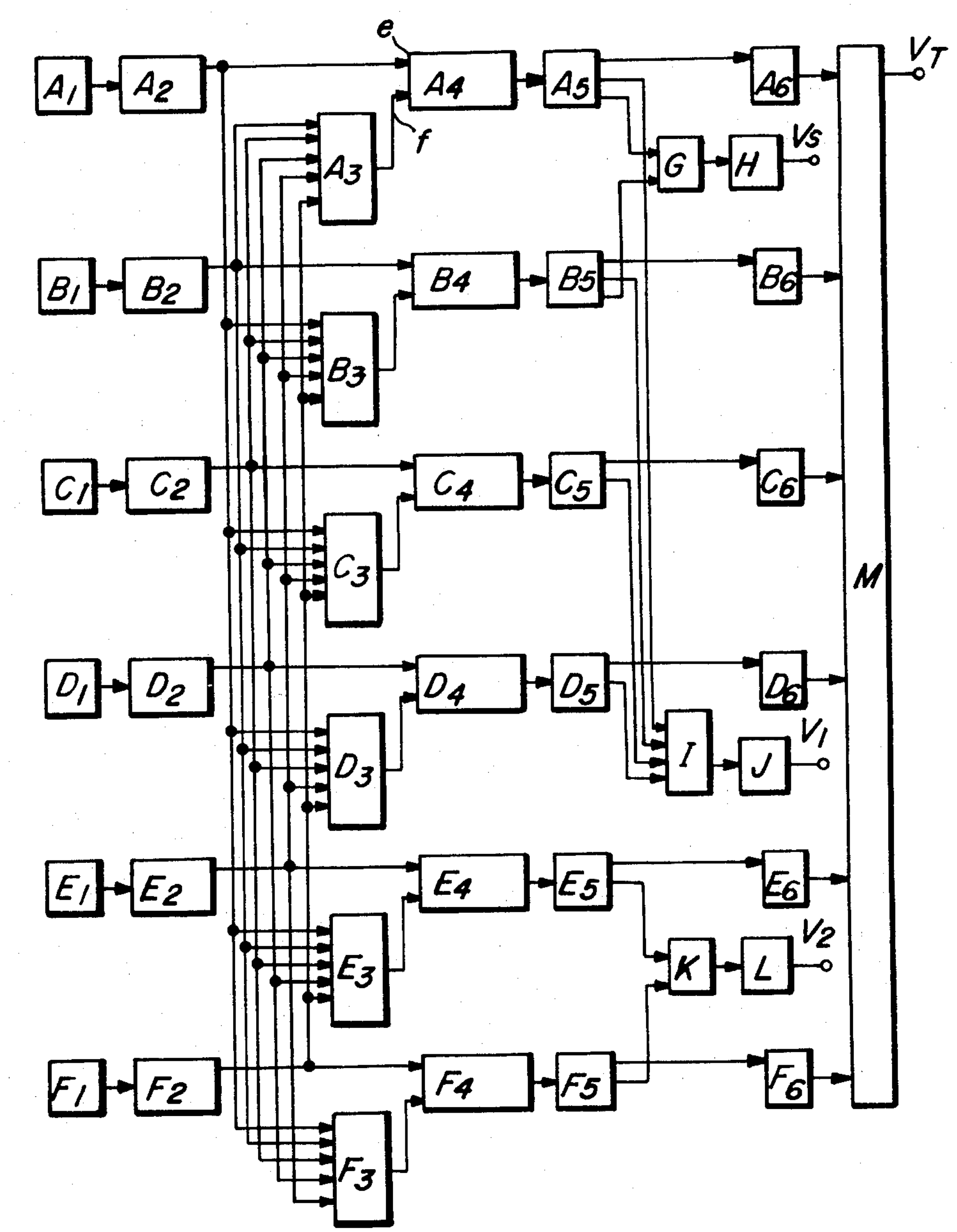
FIG. 1 is a block diagram of one embodiment of the station selector according to the invention.

Referring to FIG. 1, characters A, B, C, D, E and F with respective subscripts represent 6 different channels. More particularly, characters A and B with subscripts represent respective lower frequency band VHF channels, characters C and D with subscripts represent respective higher frequency band VHF channels, and characters E and F with subscripts represent respective UHF channels. Characters $V_T$, $V_S$, $V_1$ and $V_2$ represent output terminals which are connected to an electronic tuner (using variable capacitance diodes). A tuning voltage to be impressed upon a variable capacitance diode appears at the terminal $V_T$, a switching voltage to be impressed upon a switching diode for switching frequency bands appears at the terminal $V_S$, a source voltage to be supplied to the *r–f* amplifier stage and local oscillator stage of VHF tuner appears at the terminal $V_1$, and a source voltage to be supplied to a UHF tuner appears at the terminal $V_2$. The mixer stage of the VHF tuner always receives the source voltage. The *i–f* output signal of the UHF tuner is applied to the mixer stage of the VHF tuner to let the mixer stage act as and amplifier stage.

In FIG. 1 blocks designated by characters with the same subscript have the same circuit construction. Accordingly, as a typical example blocks $A_1$ to $A_6$ for channel A will now be described. Character $A_1$ designates a touch piece which is made of a conductor and bears an indication of the channel number. For tuning in the corresponding channel, i.e., channel A, it is touched with part of the human body (such as a finger). The block $A_2$ includes a generator to generate a signal when the touch piece is touched with part of the human body, and an amplifier and a shaping circuit to produce a signal to be coupled to the next stage memory $A_4$. When the touch piece $A_1$ is touched with a finger, the circuit $A_2$ produces an output signal to drive the memory $A_4$ which consists of a flip-flop. The output of $A_2$ is also coupled to the blocks $B_3$, $C_3$, $D_3$, $E_3$ and $F_3$. The memory $A_4$ functions such that when it directly receives the output of $A_2$ it causes the succeeding stage block $A_6$ to provide a tuning voltage and that when it receives the output of any other block than $A_2$, for instance block $B_2$, through an OR reset circuit of block $A_3$ and a terminal *f* it causes the tuning voltage generating circuit $A_6$ to provide no tuning voltage. The OR gate of the block $A_3$ allows an input signal appearing at any one of its input terminals to be passed to the terminal *f*. The block $A_5$ is an impedance converter for transmitting the output of the block $A_4$ to the succeeding stage as a control signal. For example, it may be a high input, low output impedance circuit such as an emitter follower. It may be dispensed with if the output impedance of the block $A_4$ is low enough.

The block $A_6$ comprises a gate section and a tuning voltage generating section. The gate section functions such that if a signal prevails at one input terminal *e* of the block $A_4$ the tuning voltage for channel A is provided while if a signal prevails at the other input terminal *f* no tuning voltage is provided from the block $A_4$. As mentioned earlier, the blocks for the other channels have the same constructions as the corresponding blocks described above for channel A. A block M selectively transmits the tuning voltage of any one channel to its output $V_T$, and it functions as a kind of OR circuit.

It is now assumed that channel A is tuned in and the tuning voltage for channel A prevails at the terminal $V_T$. Then, if touch piece $D_1$, for instance, is touched with a finger to switch over to channel D, the block D provides an output signal to the block $D_4$ and also to the blocks $A_3$, $B_3$, $C_3$, $E_3$ and $F_3$. When the blocks $A_3$, $B_3$, $C_3$, $E_3$ and $F_3$ receive a signal, the respectively associated tuning voltage generating circuits gate such that the tuning voltages for the respective channels are not provided. Thus, the tuning voltage at the output of $A_6$ disappears due to the signal delivered from $D_2$ to $A_3$. Similar actions are also provided for the other channels B, C, E and F. Meanwhile, upon reception of the signal from $D_2$ the memory of block $D_4$ acts to cause the block $D_6$ to provide the tuning voltage for channel D, which is supplied to the block M and appears at the output terminal $V_T$.

The station selector of FIG. 1 further includes blocks G, H, I, J, K and L. The block H has its output terminal $V_S$, at which there appears a switching voltage impressed upon a switching diode in the electronic tuner. The switching voltage must assume either a constant positive level or a constant negative level, for instance with the negative level for the lower frequency band and the positive level for the higher frequency band of the VHF band. The block H comprises a gate section and a switching section for switching between positive and negative source voltages under the control of the gate section. If no control signal is present at the input of the block H a positive voltage is available at the output terminal $V_S$, while when a control signal is present at the input a negative voltage is available at the output. The block G is an OR gate, and it passes a control signal appearing at either one of its input terminals to the block H.

With this arrangement, a negative voltage appears at $V_S$ when a lower frequency band VHF channel A or B is selected, while a positive voltage appears when a higher frequency band VHF channel is selected, so that the switching diode may be operated accordingly.

The block J has its output terminal $V_1$, at which appears a source voltage supplied to the *r–f* amplifier stage and local oscillator stage of VHF tuner. The source voltage appears at $V_1$ only when a VHF channel is selected. When a UHF channel is selected, no source voltage appears at $V_1$ so that the *r–f* amplifier stage and local oscillator stage of the VHF tuner are inoperative.

The block L has its output terminal $V_2$, at which appears source voltage supplied to UHF tuner. The source voltage appears at $V_2$ only when a UHF channel is selected. When a VHF channel is selected, no source voltage appears at $V_2$ so that the UHF tuner is inoperative. The block L may thus have the same circuit construction as the block J, and the gate section of each of these blocks may be arranged to function such that the source voltage is available in the presence of the control signal and is not available in the absence of the control signal.

The blocks I and K are OR gates that pass a control signal that may appear at one of their input terminals to their associated block J or L. With this arrangement, when a VHF channel is selected the source voltage appears at $V_1$ to render the VHF tuner operative but no source voltage appears at $V_2$ so that the UHF tuner is inoperative. Conversely, when a UHF channel is selected, the *r–f* amplifier stage and local oscillator stage of the VHF tuner are held disabled and only the mixer stage of the VHF tuner and the UHF tuner are rendered operative. In this manner, a desired channel may be tuned in.

It will be apparent from the above description in connection with a typical channel-changing operation that the present invention makes it possible to electronically effect the selection of any one of a number of television channels (as for example, three low-frequency VHF channels 1–3, nine high-frequency VHF channels 4–12 and UHF channels 13–62, such as are used in Japan).

Figure 2:
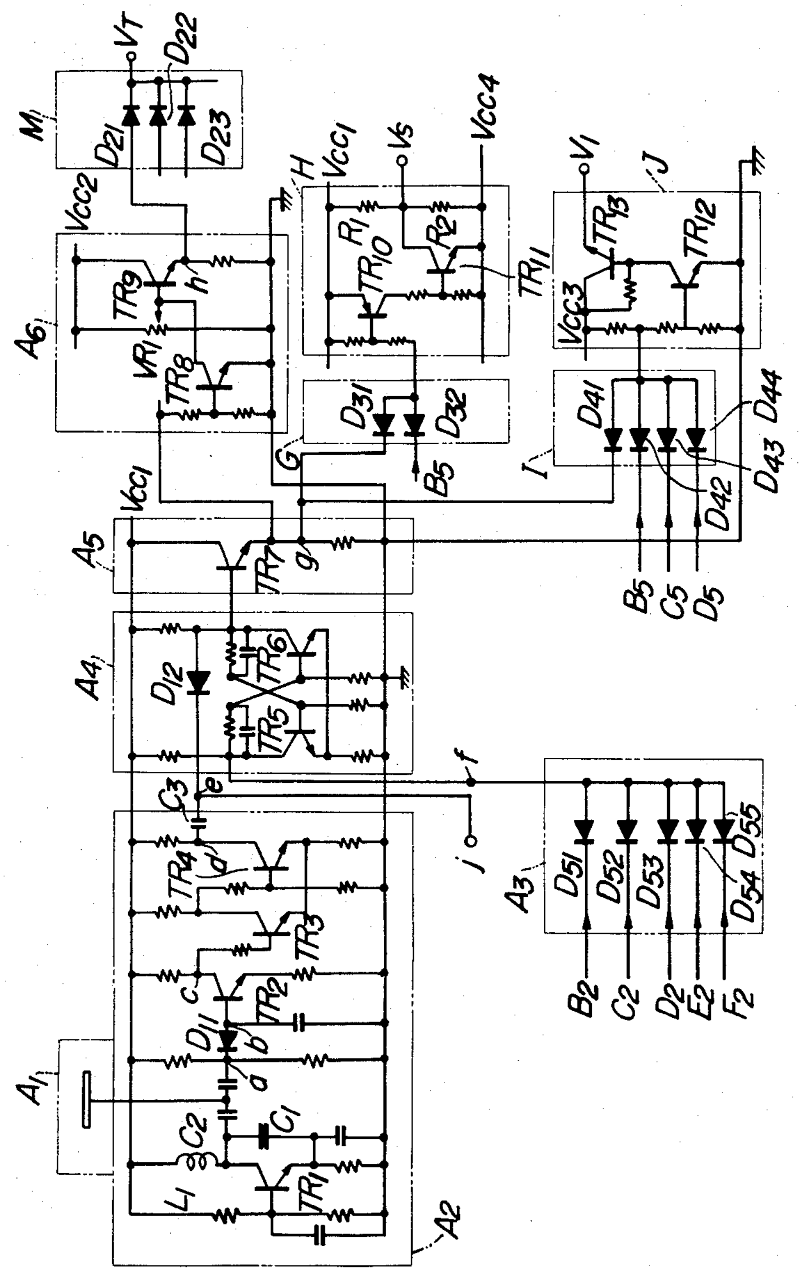
FIG. 2 is a circuit diagram of part of the embodiment of FIG. 1.
Figures 3, 4:
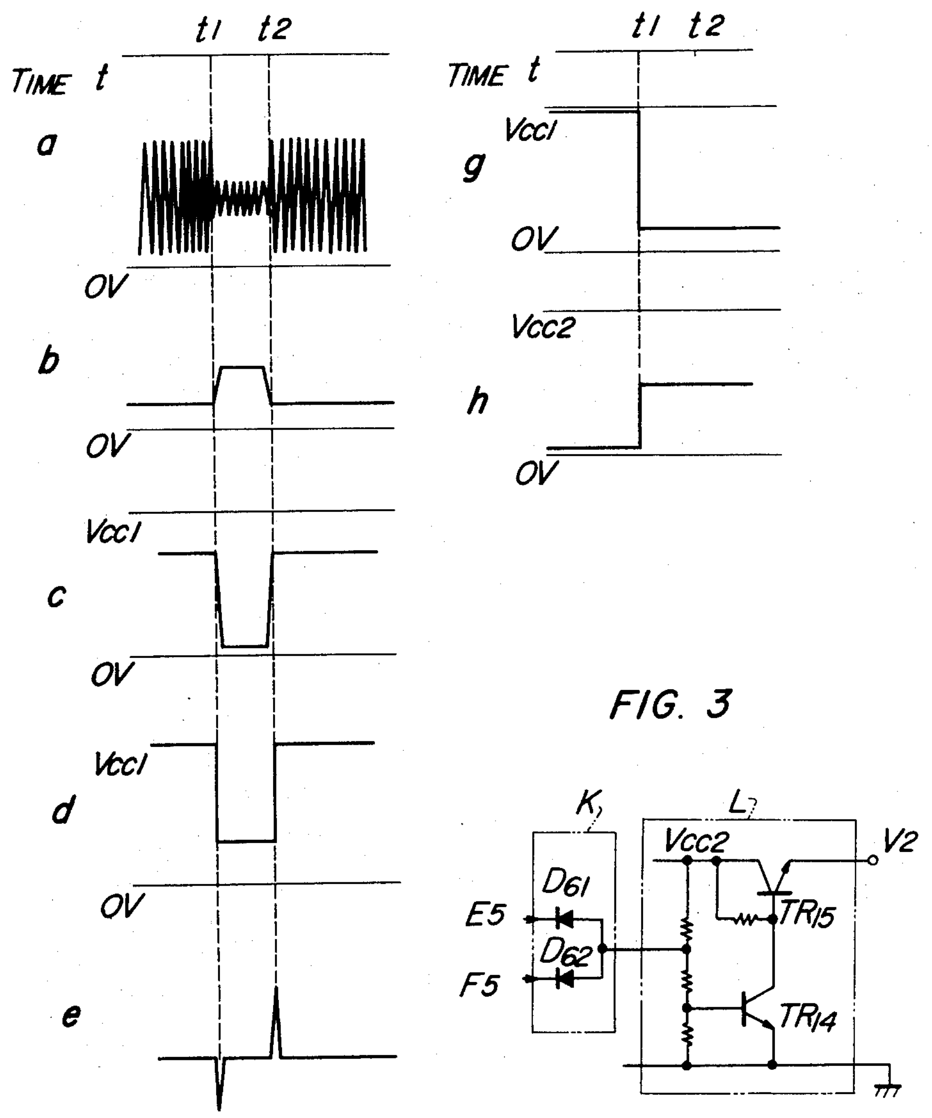
FIG. 3 is a circuit diagram of another part of the embodiment of FIG. 1.
FIG. 4 is a waveform chart for illustrating the operation of the embodiment of FIG. 1.

A specific embodiment of the invention is shown in FIGS. 2 and 3. In FIG. 2, the individual blocks are designated by the same reference symbols as in FIG. 1. Block $A_2$ which is a detecting circuit comprises an oscillator, a circuit to change the amplitude of the oscillator output, a detector, an amplifier and a shaping circuit. The oscillator consists of transistor $TR_1$, and its frequency of oscillation is substantially determined by the inductance of $L_1$ and capacitance of $C_1$. When a touch piece in block $A_1$ is touched with a finger, the oscillator output is divided between capacitance $C_1$ and a capacitance between the touch piece and the finger in contact therewith, so that the amplitude of the oscillator output at point *a*, is reduced as shown in curve *a* in FIG. 4. The period *t* between $t_1$ and $t_2$ during which the touch piece is touched with a finger may be either comparatively long or almost momentary. During this period the amplitude is reduced.

The detector consisting of diode $D_{11}$ detects the oscillator output. When the touch piece is touched with finger, the voltage at point *b* is increased as shown at *b* in FIG. 4, whereupon transistor $TR_2$ is turned conductive. If the touch piece is not touched, the voltage at point *b* is low and the transistor $TR_2$ remains "off." The waveform of the voltage at point *b* is of integral type and has inclined rising and falling portions. Therefore, the voltage waveform at point *c* also has corresponding inclined rising and falling portions. Since the next stage memory section uses a T-type flip-flop, it is necessary to provide a waveform without any inclined portion and having a sharp transient characteristic for producing a trigger pulse. Accordingly, the output signal at point *c* is coupled to a Schmitt trigger circuit of transistors $TR_3$ and $TR_4$ for converting the signal waveform into the one having a sharp transient characteristic, as shown at *d* in FIG. 4. The waveform thus provided for point *d* is then differentiated through capacitor $C_3$ to produce a trigger pulse for the next stage flip-flop of transistors $TR_5$ and $TR_6$, as shown at *e* in FIG. 4. If a negative pulse is produced as the trigger pulse, touching of the touch piece $A_1$ with a finger causes an action of the flip-flop to be described hereinafter. If a positive pulse is to be provided, diodes $D_{11}$ and $D_{12}$ and diodes $D_{51}$, $D_{52}$, . . . in block $A_3$ may be oppositely connected in respect of their polarity. By so arranging, a positive pulse will appear upon touching the touch piece with a finger. In this case, it is necessary to alter the connection so that the signal appearing at point *e* is coupled to the collector of the transistor $TR_5$ and the signal appearing at point *f* to the collector of the transistor $TR_6$.

In the operation of the flip-flop in block $A_4$, upon appearance of a negative pulse at point *e* the transistor $TR_5$ is cut off while the transistor $TR_6$ is turned conductive and saturated. As a result, at the instant $t = t_1$ the voltage at point *g* is reduced to nearly the earth potential, as shown at *g* in FIG. 4, cutting off transistor $TR_8$ so that a tuning voltage which is preset with variable resistor $VR_1$ appears at point *h*, as shown at *h* in FIG. 4. With the tuning voltage appearing at point *h* the corresponding diode $D_{21}$ in the OR circuit of block M is rendered conductive (with all the other diodes in block M rendered "off"), whereupon the tuning voltage preset with $VR_1$ for channel A appears at $V_T$ and is coupled to the electronic tuner to select channel A.

Meanwhile, with the reduction of the voltage at point *g* a diode $D_{31}$ in the OR circuit of block G is activated to trigger and saturate gate circuit transistor $TR_{10}$ in block H, thus also saturating transistor 11. As a result of saturation of the transistor $TR_{11}$, its collector potential becomes substantially equal to its emitter potential, so that a negative voltage ($Vcc_4$) appears at $V_S$. With the negative voltage at $V_S$ the electronic tuner selects a lower frequency band VHF channel.

Also, with the reduction of the voltage at point *g* a diode $D_{41}$ in the OR circuit of block I is activated to cut off gate circuit transistor $TR_{12}$ to trigger transistor $TR_{13}$ in the flip-flop of block J. The transistor $TR_{13}$ has its base connected through a resistor to its collector so that a voltage slightly lower than its collector voltage $Vcc_3$ appears at its emitter (since upon the triggering of the transistor $TR_{13}$ it is saturated or nearly saturated). Upon appearance of a voltage at terminal $V_1$ the VHF tuner is rendered operative since the source voltage is impressed on the *r–f* amplifier stage and local oscillator stage of the VHF tuner and it is always applied to the mixer stage. At this time the tuning voltages of the other channels do not appear at the input of the block M in view of point *j* being connected to the blocks $B_3$, $C_3$, $D_3$, $E_3$ and $F_3$ in FIG. 1.

It will be appreciated from the foregoing that by touching the touch piece $A_1$ with a finger the lower frequency band VHF channel A can be selected.

Now if another channel, for instance channel C, is to be selected, the touch piece $C_1$ is touched with a finger. Then, the same action as described above for the blocks $A_2$, $A_4$, $A_5$, $A_6$, I and J takes place in the blocks $C_2$, $C_4$, $C_5$, $C_6$, I and J, and a tuning voltage for channel C appears at the output of the block $C_6$ to activate the corresponding diode in the block M so that the tuning voltage for channel C appears at the terminal $V_T$.

Meanwhile, the output of the block $C_2$ also appears at block $A_3$, causing a negative trigger pulse to appear at point *f* through the channel C diode in the OR reset circuit $A_3$, thus inverting the flip-flop in block $A_4$, that is, triggering $TR_5$ and cutting off $TR_6$, so that a voltage substantially equal to $Vcc_1$ appears at point *g*. With the increase of voltage (substantially equal to $Vcc_1$) at point *g* the gate circuit transistor $TR_8$ in block $A_6$ is saturated. As a result, the voltage at point *h* disappears (or is substantially reduced to the earth potential) to cut off diode $D_{21}$ in block M. Thus, only the tuning voltage for channel C appears at terminal $V_T$.

Also, with the increase of voltage at point *g* diode $D_{31}$ in block G is cut off. Since the other diode $D_{32}$ in block G (which diode is connected to the block $B_5$ in FIG. 1) is "off" (for the output voltage of $B_5$ is high like the output of $A_5$), the gate circuit transistor $TR_{10}$ in block H is cut off to cut off the transistor $TR_{11}$, so that a voltage (set to a positive value) as a division of voltage $Vcc_1 - Vcc_4$ between resistors $R_1$ and $R_2$ appears at terminal $V_S$. With the positive voltage appearing at terminal $V_S$ a switching diode in the electronic tuner is activated so that a higher frequency band VHF channel may be selected.

Further, with the increase of voltage at point *g* the diode $D_{41}$ in block I is cut off while another diode $D_{43}$ which is connected to the block $C_5$ is activated so that the transistors $TR_{12}$ and $TR_{13}$ remain in the same state as when channel A is tuned in. Thus, a voltage slightly lower than $Vcc_3$ appears at $V_1$, thus rendering the VHF tuner operative.

To summarize the description so far, by touching the touch piece $C_1$ with a finger the VHF tuner is rendered operative to be ready to select a higher frequency band VHF channel, while the tuning voltage for channel C which is one of the higher frequency band VHF channels appears at terminal $V_T$, so that the channel C is selected.

The case of selecting a UHF channel, for instance channel E, will now be considered.

Upon touching the touch piece $E_1$ with a finger the same sequence of events as described earlier for the blocks $A_2$, $A_3$, $A_5$ and $A_6$ takes place in the blocks $E_2$, $E_4$, $E_5$ and $E_6$, causing a tuning voltage for channel E to appear at the tuning voltage terminal $V_T$. As a result, a diode in block M corresponding to channel E is activated while the other diodes remain "off." Also, both the diodes in block G are rendered "off" (since the blocks $A_5$, $B_5$, $C_5$ and $D_5$ all provide a positively high voltage). As a result, the gate transistor $TR_{12}$ in block J is saturated so that its collector voltage becomes substantially equal to its emitter voltage, thus cutting off the transistor $TR_{13}$ to render the voltage at $V_1$ to the earth potential. When the potential of $V_1$ is reduced to the earth potential, the *r-f* amplifier stage and local oscillator stage of the VHF tuner are disabled so that no VHF channel can be tuned in. Thus, only the mixer stage of the VHF tuner which receives the *i-f* signal from the UHF remains operative.

The blocks K and L respectively have the same circuit constructions as the blocks I and J, as shown in FIG. 3. In operation, when the output of block $E_5$ or $F_5$ is reduced nearly to the earth potential, that is, when channel E or F is selected, diode $D_{61}$ or $D_{62}$ is activated to cut off transistor $TR_{14}$ and trigger transistor $TR_{15}$, thus causing a voltage to appear at $V_2$. Since the terminal $V_2$ is the power supply terminal for the UHF tuner, the UHF tuner is rendered operative. When the output of the block $E_5$ or $F_5$ is increased to a high level, that is, when either channel A, B, C or D is selected, the diodes $D_{61}$ and $D_{62}$ are all rendered "off" to cause saturation of transistor $TR_{14}$, thus rendering the voltage at $V_2$ to the earth potential to render the UHF tuner inoperative.

As has been described, the station selector of the above construction, when combined with an electronic tuner, enables switching to a desired channel with one-touch operation. Also, since mechanical parts involved are very few, yield and reliability can be increased.

As for the detecting circuit $A_2$ described above in connection with FIGS. 2 and 4 and which detects the change of amplitude of the oscillator output, certain alternatives can be considered, namely one which utilizes the surface leak resistance of human body and one having resort to a superimposed hum voltage.

Figure 5:
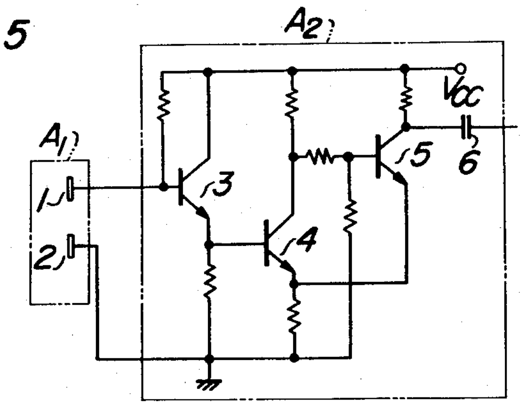
FIG. 5 is a circuit diagram showing part of another embodiment.

FIG. 5 shows an alternative of the detecting circuit which utilizes the surface leak resistance (100 kilohms to 3 megohms) of the human body. In the Figure, numerals 1 and 2 designate electrodes to be touched with finger. When the electrodes 1 and 2 are touched with a finger, the base potential of transistor 3 is reduced due to the leak resistance of the human body to change the conductivity of the transistor. As a result, the emitter potential on the transistor 3 is reduced to cause inversion of a Schmitt circuit of transistors 4 and 5. The output of the Schmitt circuit is coupled through a capacitor 6 to the next stage flip-flop $A_4$ and OR gates $B_3$, $C_3$, $D_3$, $E_3$ and $F_3$, and the following sequence is the same as for the embodiment of FIG. 2.

Figure 6:
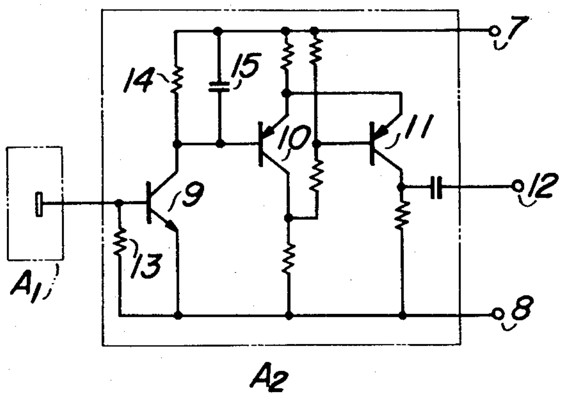
FIG. 6 is a circuit diagram showing part of a further embodiment.

FIG. 6 shows another alternative of the detecting circuit which has resort to a hum voltage. In the Figure, numerals 7 and 8 designate terminals between which a hum voltage is impressed via a source transformer or a capacitance or resistance connected between the primary and secondary of the source transformer. Numeral 9 designates a detecting transistor, numerals 10 and 11 transistors constituting a Schmitt trigger circuit, numeral 12 an output terminal connected to the next stage flip-flop $A_4$ and OR gates $B_3$, $C_3$, $D_3$, $E_3$ and $F_3$, and numeral 13 a base resistance for the transistor 9.

Figure 7:
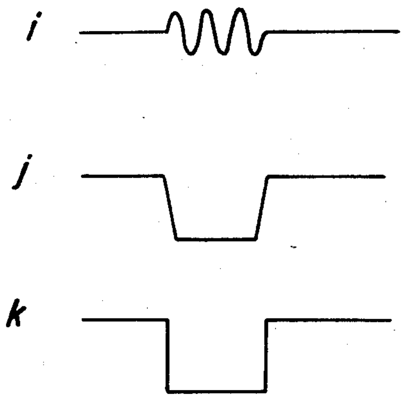
FIG. 7 is a waveform chart to illustrate the operation of the embodiment of FIG. 6.

In operation, upon touching the touch piece $A_1$ with a finger a hum voltage as shown at *i* in FIG. 7 is generated across the resistor 13 due to the impedance of the human body with respect to the earth. The hum voltage thus generated is amplified by the transistor 9 and rectified by resistor 14 and capacitor 15 connected to the collector of the transistor 9 to produce a signal as shown at *j* in FIG. 7. With this rectified signal the Schmitt trigger circuit is inverted. In this manner, a signal as shown at *k* in FIG. 7 appears at the output terminal 12, so that the signal as shown in FIG. 2 may be provided to the succeeding stages for the switching of channels.

While the foregoing embodiment has concerned with television receivers, similar arrangements for use in other communication units such as radio sets may be obtained in accordance with the invention.

What is claimed is:

1. A one-touch controllable channel selector for use with an electronic tuner having variable capacitance diodes comprising: touch pieces to be touched by a part of the human body and corresponding respectively to channels to be tuned in; detector circuits connected to said touch pieces, respectively, for detecting the touch of the human body on the respective touch pieces, each detector comprising a signal generator for generating a touch signal at the time of said touch, an amplifier for amplifying the touch signal and a waveform converting circuit for converting an output from said amplifier into a trigger signal; memory circuits connected to said detectors, respectively, and controlled by the respective trigger signals; circuit means connected to said memory circuits, respectively, and to said detector circuits to reset the corresponding memory circuit by the trigger signal supplied from the detector circuits other than the corresponding detector circuit; and gate circuits controlled by the respective memory circuits, said gate circuits each supplying a channel selecting voltage, a band switching voltage and a power voltage to said variable capacitance diodes in response to the corresponding memory circuit.

2. A selector according to claim 1, wherein said signal generators each comprises an oscillator to generate a signal at a given frequency, a circuit furnished with the signal output of said oscillator, the amplitude of the output of said last-mentioned circuit being changed when the corresponding touch piece is touched by part of the human body, and a detector to detect the output of said last-mentioned circuit.

3. A selector according to claim 1, wherein said signal generators each comprises a detecting transistor, the base potential of said detecting transistor being changed when the corresponding touch piece is touched by a part of the human body, and a threshold discriminator to detect a change in the conductivity of said detecting transistor.

4. A selector according to claim 1, wherein said detecting circuits each comprises a circuit to form a closed current loop including the corresponding touch piece, said closed current loop being formed when said corresponding touch piece is touched by part of the human body, and a detector to detect a change in the terminal voltage across an impedance element inserted in said closed current loop.

5. A selector according to claim 1, wherein said memories each consists of a flip-flop set by the output of the associated signal generator circuit and reset by the output of any other one of said control circuits than the one associated to said associated signal generator circuit.

6. A channel selector, comprising:

a plurality of touch pieces corresponding to respective channels to be tuned;

a plurality of detecting circuits individually coupled to corresponding touch pieces for providing an output signal when the corresponding touch piece is touched by a portion of the human body, said detecting circuits each comprising an oscillator circuit for generating a signal at a given frequency, an amplitude changing circuit, the amplitude of which varies when the corresponding touch piece is touched, and means for detecting the change in amplitude of the output of said amplitude changing circuit;

a plurality of memory means coupled to respective ones of said detecting circuits;

a plurality of control circuits individually coupled to the reset inputs of respective ones of said memory means, said control circuits also being coupled to each of said detecting circuits other than the one coupled to the respective one of said memory means to which that control circuit is coupled;

a plurality of gate circuits individually coupled to respective outputs of said memory means;

circuit means coupled to and controlled by said gate circuits for selectively providing tuning voltages to channel determining variable capacitance diodes in an electronic tuner and for providing frequency band and voltage source switching signals.

* * * * *